(12) United States Patent
Sequi et al.

(10) Patent No.: US 10,427,577 B2
(45) Date of Patent: Oct. 1, 2019

(54) INTERIOR TRIM ASSEMBLY INCLUDING A DEPLOYABLE SUPPORT SUB-ASSEMBLY FOR A MOTOR VEHICLE (71) Applicant: FAURECIA INTERIOR SYSTEMS, INC., Auburn Hills, MI (US)

(72) Inventors: Jorge Sequi, Valencia (ES); Daniel Vander Sluis, Rochester Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/812,623

(22) Filed: Nov. 14, 2017

(65) Prior Publication Data
US 2019/0143869 A1 May 16, 2019

(51) Int. Cl.
*B60N 3/00* (2006.01)
*B60R 13/02* (2006.01)

(52) U.S. Cl.
CPC .......... *B60N 3/002* (2013.01); *B60R 13/0243* (2013.01); *B60R 2013/0287* (2013.01)

(58) Field of Classification Search
CPC ............ B60R 11/0241; B60R 11/0252; B60R 2011/0015; B60R 2011/0075; B60R 2011/0077; B60R 2011/0082; B60N 3/002; B60N 3/004; B60N 3/007; B60N 3/102; B60N 2/206; B60N 2/79
USPC ..... 296/152, 180.1, 146.6, 154, 146.1, 1.02, 296/97.1, 97.8, 99.1; 49/502, 462, 373, 49/383, 460, 465, 475.1, 48, 490.1
See application file for complete search history.

(56) References Cited

U.S. PATENT DOCUMENTS

| | | | | |
|---|---|---|---|---|
| 1,503,690 A | * | 8/1924 | Kroschel | A47B 5/04 108/33 |
| 2,963,078 A | | 12/1960 | Ferrelle | |
| 3,899,982 A | | 8/1975 | Fetzej | |
| 4,829,910 A | * | 5/1989 | Lirette | A47B 3/00 108/35 |
| 5,192,111 A | | 3/1993 | Hanemaayer | |
| 5,527,084 A | * | 6/1996 | Scherf | B60R 21/0428 296/153 |
| 6,056,350 A | * | 5/2000 | Brutsaert | B60P 3/343 135/88.11 |
| 7,240,957 B2 | * | 7/2007 | Dry | B60R 13/0243 29/91.1 |
| 7,963,231 B2 | | 6/2011 | Osborne et al. | |
| 9,770,097 B2 | * | 9/2017 | Ehrreich | A47B 5/04 |

(Continued)

*Primary Examiner* — D Glenn Dayoan
*Assistant Examiner* — Sunsurraye Westbrook
(74) *Attorney, Agent, or Firm* — LKGlobal | Lorenz & Kopf, LLP (57) ABSTRACT

Interior trim assemblies for motor vehicles are provided. In one example, an interior trim assembly for a vehicle interior of a motor vehicle includes an interior trim panel. The interior trim panel has a first outer surface for facing the vehicle interior and a second outer surface on a side opposite the first outer surface. The interior trim panel has an opening formed therethrough. A deployable support sub-assembly is coupled to the interior trim panel. The deployable support sub-assembly includes a support layer and a first moveable arm that is configured to move the support layer from a stowed position adjacent to the second outer surface of the interior trim panel through the opening to a deployed position adjacent to the first outer surface of the interior trim panel.

15 Claims, 8 Drawing Sheets (56) References Cited

U.S. PATENT DOCUMENTS

| | | |
|---|---|---|
| 2002/0060481 A1 | 5/2002 | Jones |
| 2003/0188672 A1* | 10/2003 | Parent .................... A47B 5/006 108/134 |
| 2006/0266779 A1 | 11/2006 | Mozer et al. |
| 2008/0315606 A1 | 12/2008 | Sturt et al. |

* cited by examiner

FIG. 8

INTERIOR TRIM ASSEMBLY INCLUDING A DEPLOYABLE SUPPORT SUB-ASSEMBLY FOR A MOTOR VEHICLE

TECHNICAL FIELD

The technical field relates generally to interior trim assemblies for motor vehicles, and more particularly to interior trim assemblies including an interior trim panel and a deployable support sub-assembly that is coupled to the interior trim panel and that includes a deployable support layer for supporting an object.

BACKGROUND

In modern motor vehicles, provisions for fold-out trays or other usable surfaces that can be extended or otherwise deployed for supporting, and/or using various objects or devices (e.g., portable consumer electronic devices, "smart" phones, tablets, digital music storage/player devices, and other such objects) are being provided with increasingly frequency. Often such provisions are arranged in the vehicle interior, particularly in the areas of the backseat or the dashboard where more space is available for packaging and using the fold-out tray or other usable surface.

In one example, disclosed in U.S. Patent Application Publication No. 2006/0266779 by Mozar et al., a fold-up tray is provided in a backseat area of a motor vehicle. The tray is exposed when stored in a folded-up condition clipped against an outer surface of an interior bolster trim area. For use, a backseat occupant unclips the folded-up tray from the interior bolster trim area, manually unfolds the tray, and positions the unfolded tray on an armrest area adjacent, to the interior bolster trim area, in the unfolded condition, the tray has a usable surface that the backseat occupant can use for supporting various objects, devices, or the like. Unfortunately, such an arrangement requires excessive interior space for storing and using the fold-up tray and further, is limited for practical use in the backseat area of the motor vehicle. Additionally, the fold-up tray is fully exposed when stored along the outer surface of the interior bolster trim area, which is aesthetically undesirable.

Accordingly, it is desirable to provide an assembly for an interior of a motor vehicle which can provide a usable surface that can be extended or otherwise deployed for supporting an object which overcomes one or more of the foregoing issues. Furthermore, other desirable features and characteristics of the present disclosure will become apparent from the subsequent detailed description and the appended claims, taker in conjunction with the accompanying drawings and this background.

BRIEF SUMMARY

Interior trim assemblies for vehicle interiors of motor vehicles are provided herein. In accordance with an exemplary embodiment, an interior trim assembly for a vehicle interior of a motor vehicle includes an interior trim panel. The interior trim panel has a first outer surface for facing the vehicle interior and a second outer surface on a side opposite the first outer surface. The interior trim panel has an opening formed therethrough extending from the first outer surface to the second outer surface. A deployable support sub-assembly is coupled to the interior trim panel. The deployable support sub-assembly includes a support layer and a first moveable arm that is coupled to the support layer. The first movable arm includes a first arm section and a second arm section pivotably coupled to the first arm section. The first and second arm sections cooperate to move the support layer from a stowed position, adjacent to the second outer surface of the interior trim panel through the opening to a deployed position adjacent to the first outer surface of the interior trim panel.

BRIEF DESCRIPTION OF THE DRAWINGS

The various embodiments will hereinafter be described in conjunction with the following drawing Figures wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior trim assemblies for motor vehicles that can provide a deployable usable surface for supporting an object. The exemplary embodiments taught herein provide an interior trim assembly for a vehicle interior of a motor vehicle. The interior trim assembly includes an interior trim panel that has a first outer surface exposed to the vehicle interior and a second outer surface on a backside of the interior trim panel opposite the first outer surface. An opening is formed through the interior trim panel extending from the first outer surface to the second outer surface.

A deployable support sub-assembly is coupled to the interior trim panel. The deployable support sub-assembly includes a support layer that has a support surface for supporting an object. A first movable arm is coupled to the support layer and includes a first arm section and a second arm section pivotably coupled to the first arm section. The first and second arm sections cooperate to move the support layer from a stowed position adjacent to the second outer surface of the interior trim panel through the opening to a deployed position adjacent to the first outer surface of the interior trim panel.

In an exemplary embodiment the support layer is efficiently stored behind the interior trim panel, e.g., in a rolled-up or vertical condition, adjacent to the second outer surface when in the stowed position. Advantageously, storing the support layer behind the interior trim panel allows the support layer to be concealed from the vehicle interior during storage when not in use, which is aesthetically desirable. Moreover, efficiently storing the support layer behind the interior trim panel allows the deployable support sub-assembly to be used in areas of the vehicle interior that may have relatively limited packaging space, such as, for example, in the front seat area as well as in other areas of the motor vehicle (e.g., backseat area and the like).

In an additional advantage of the interior trim assembly disclosed herein is that, in some embodiments, the support surface of the support layer extends substantially horizontally when in the deployed position. A substantially horizontal support surface is a particularly useful orientation, for example, for supporting an object without the object becoming unstable and/or falling from the support layer.

An additional advantage of the interior trim assembly disclosed herein is that, in some embodiments, the deployable support sub-assembly further includes a second movable arm coupled to the support layer. The second movable arm includes a third arm section and a fourth arm section pivotably coupled to the third arm section. The first and second movable arms cooperate to move the support layer between the stowed position and the deployed position. By using the first and second movable arms to move the support layer, the support layer can be moved between the stowed and deployed positions very smoothly and efficiently.

In an additional advantage of the interior trim assembly divided herein is that, in some embodiments, the first and second movable arms are disposed adjacent to the support layer opposite the support surface. By positioning the first and second movable arm under the support layer opposite the support surface, the support layer is additionally supported by the movable arms for enhanced structure for supporting an object.

An additional advantage of the interior trim assembly disclosed herein is that, in some embodiments, the first and second movable arms are configured to fold towards each other when the support layer is moved from the deployed position towards the stowed position and unfold away from each other when the support layer is moved from the stowed position towards the deployed position. By having the movable arms uphold away from each other when moved towards the stowed position and move towards each other when moved towards the deployed position, the first and second movable arms can be efficiently packaged within a limited amount of space.

In an additional advantage of the interior trim assembly disclosed herein is that, in some embodiments, the deploy able support sub-assembly further includes a movable cross-support structure coupled to the first and second movable arms. The movable cross-support structure is configured to expand when the first and second movable arms unfold during movement from the stowed position towards the deployed position and to collapse when the first and second movable arms fold during movement from the deployed position towards the stowed position. By having the movable cross-support structure coupled to the first and second movable arms and further, to be collapsible and expandable during movement between the stowed and deployed positions, additional support and structure can be efficiently provided within a limited packaging space to the first and second movable arms for folding and unfolding.

In an additional advantage of the interior trim assembly disclosed herein is that, in some embodiments, the first and second movable arm is and the movable cross-support structure are cooperatively configured to help support the support layer when in the deployed position. This arrangement provides additional structure to the support layer for supporting an object.

An additional advantage of the interior trim assembly disclosed herein is that, in some embodiments, the movable cross-support structure includes a plurality of cross-support structure sections. The cross-support structure sections are slidingly coupled together to allow telescopic movement of the movable cross-support structure when the support, layer is moved between the stowed position and the deployed position. By having the movable cross-support structure including the cross-support, structure sections configured for telescopic movement the movable cross-support structure can be efficiently packaged within a limited amount of space.

In an additional advantage of the interior trim assembly disclosed herein is that, in some embodiments, the deployable support sub-assembly further includes a rolling member that is disposed adjacent to the second outer surface of the interior trim panel and that is coupled to a first end portion of the support layer. The rolling member is configured to rotate in a first direction for wrapping the support layer about the rolling member when the support layer is moved from the deployed position towards the stowed position and to rotate in a second direction that is opposite the first direction to unwrap the support layer from the rolling member when the support layer is moved from the stowed position towards the deployed position. Wrapping the support layer around the rolling member helps efficiently store the support layer in the stowed position within a limited amount of packaging space behind the interior trim panel, while unwrapping the support layer from the rolling member helps efficiently extend the support layer to the deployed position for supporting an object.

An additional advantage of the interior trim assembly disclosed herein is that, in some embodiments, the deployable support sub-assembly further includes a storage housing that is disposed adjacent to the second outer surface of the interior trim panel and that is slidingly coupled to an edge portion of the support layer. The storage housing is configured to receive the support layer when the support layer is moved from the deployed position towards the stowed position and to release the support layer when the support layer is moved from the stowed position towards the deployed position. Arranging the support layer within the storage housing helps efficiently store the support layer in the stowed position within a limited amount of packaging space behind the interior trim panel while releasing the support layer from the storage housing helps efficiently extend the support layer in the deployed position for supporting an object.

In an additional advantage of the interior trim assembly disclosed herein is that, in some embodiments, the storage housing is configured for stowing at least a portion of the support layer in a substantially vertical direction when the support layer is in the stowed position. Storing at least a portion of the support layer in a substantially vertical direction allows the support layer to be efficiently stored in the stowed position within a limited amount of packaging space behind the interior trim panel.

An additional advantage of the interior trim assembly disclosed herein is that, in some embodiments, the deployable support sub-assembly further comprises an outer trim feature coupled to an end portion of the support layer. The outer trim feature is disposed adjacent to the first outer surface of the interior trim panel when the support layer is in the stowed position and is moved with the support layer in a direction towards the vehicle interior away from the first outer surface of the interior trim panel when the support layer is moved towards the deployed position. The outer trim feature helps conceal the support layer behind the interior trim panel when in the slowed position to help create a more aesthetically desirable appearance for the interior trim assembly.

In an additional advantage of the interior trim assembly disclosed herein is that, in some embodiments, the interior trim panel is a door panel. Because of the limited packaging space typically within a door panel a usable support surface cannot practically be deployed from the door panel. However, because the deployable support sub-assembly can be efficiently packaged within a limited amount of space, a door panel can be practically equipped with a deployable usable surface.

An additional advantage of the interior trim assembly disclosed herein is that, in some embodiments, the support layer includes at least one of a polymer layer, a plastic layer, a textile layer, and an elastomeric layer. Such a support layer can be flexible for efficiently storing in the stowed position and can be tensioned or otherwise semi-rigidized by the one or more movable arms, in the deployed position for supporting an object.

In additional advantage of the interior trim assembly disclosed herein is that, in some embodiments, the support layer includes a plurality of juxtaposed pleated sections coupled together. Such a support layer can be flexible for efficiently storing in the stowed position and can be tensioned or otherwise semi-rigidized by the one or more movable arms in the deployed position for supporting an object.

Figure 1:
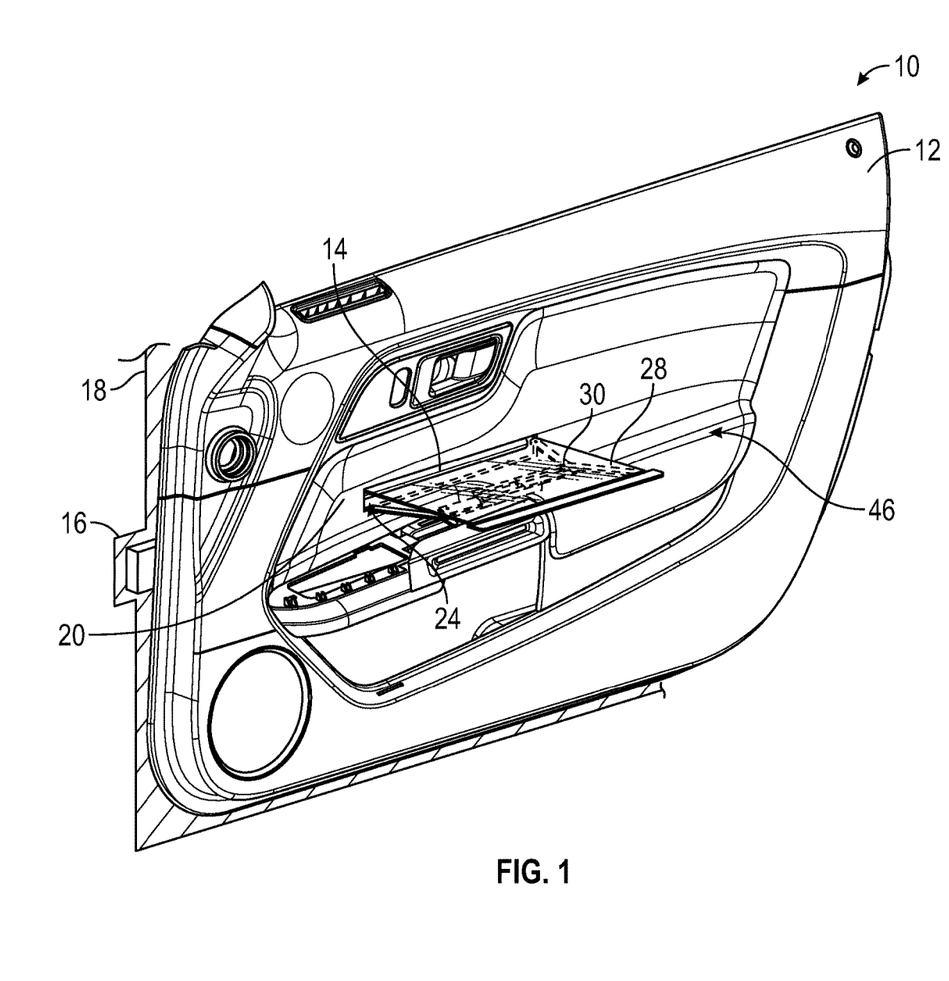
FIG. 1 illustrates a perspective view of an interior trim assembly including a deployable support sub-assembly in a deployed position in accordance with an exemplary embodiment.

FIG. 1 illustrates a perspective view of an interior trim assembly 10 in accordance with an exemplary embodiment. The interior trim assembly 50 includes an interior trim panel 12 and a deployable support sub-assembly 14. As will be discussed in further detail below, the deployable support sub-assembly 14 is coupled to the interior trim panel 12.

The interior trim assembly 10 is configured to be mounted and secured to a structure 16 of a motor vehicle. In an exemplary embodiment, the interior trim assembly 10 is arranged along a vehicle interior portion of a door 18 of the motor vehicle and the interior trim panel 12 is a door panel. The door panel is mounted and secured to the structure 16 of the door 18. The door panel can be positioned laterally adjacent to a driver seat, a passenger front seat or alternatively, laterally adjacent to a passenger backseat of the motor vehicle. Alternatively, the interior trim panel 12 may be an instrument panel, a console, or other vehicle interior panel of the motor vehicle.

The interior trim panel 12 may be formed by molding a plastic or polymeric material such as, for example, polypropylene (PP), thermoplastic olefin (TPO), a PP/TPO blend, polycarbonate (PC), polyamide (PA), acrylonitrile butadiene styrene (ABS). In addition, the plastic or polymeric material may also include one or more other ingredients, such as rubber, fillers such as talc and the like, impact modifiers, stabilizers, processing additives and/or mold release agents, reinforcing fibers such as glass fibers, natural fibers, and the like, anti-scratch additives, pigments and/or molded-in-color additives, adhesion promoters, recycled product(s), and the like. Other materials known to those skilled in the art may also be used for forming the interior trim panel 12.

In an exemplary embodiment, the outer surface 20 of the interior trim panel 12 faces toward the vehicle interior and is exposed to a vehicle occupant. As such, the outer surface 20 of the interior trim panel 12 may be decorated for providing an aesthetically appealing appearance. For example, the outer surface 20 of the interior trim panel 12 can have a hard-decorative surface, such as a mold-in-color surface, a painted surface, or the like. Alternatively, the outer surface 20 of the interior trim panel 12 can be covered by foam and skin, such as in well-known foam-in-place, bi-laminate, or tri-laminate constructions, to provide a "soft finish, decorative panel."

Figure 5A:
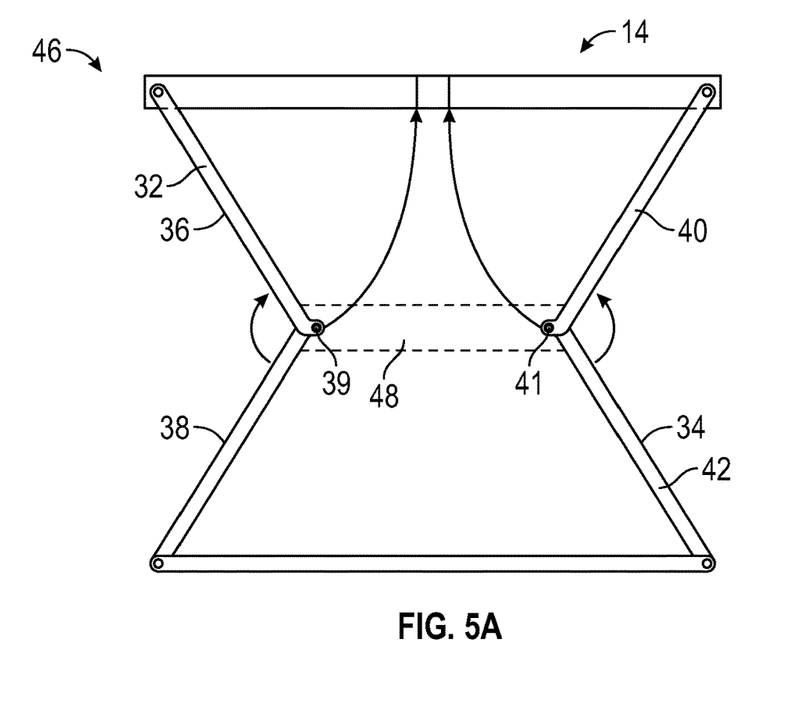
FIG. 5A illustrates a plan view of the deployable support sub-assembly depicted in FIG. 4 in the deployed position.
Figure 5B:
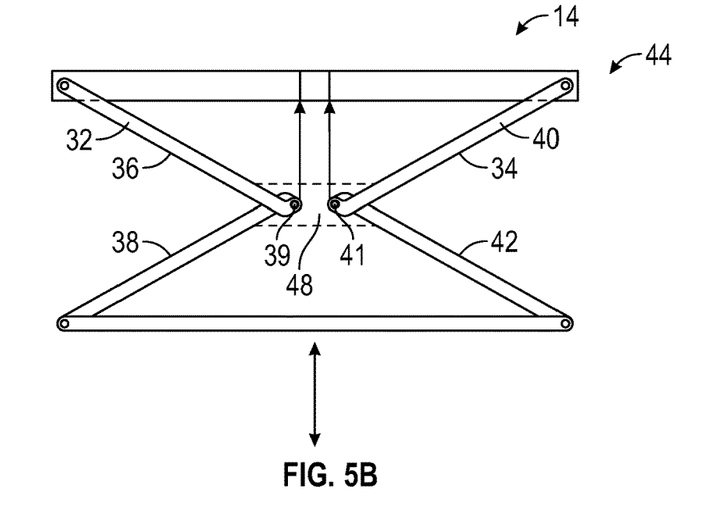
FIG. 5B illustrates a plan view of the deployable support sub-assembly depicted in FIG. 4 in the stowed position.
Figure 5C:
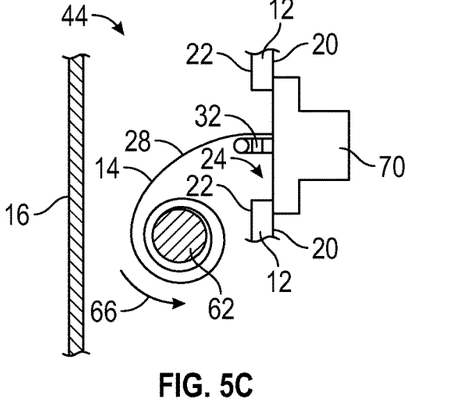
FIG. 5C illustrates a cross-sectional view of the deployable support sub-assembly depicted in FIG. 4 in the stowed position.
Figure 5D:
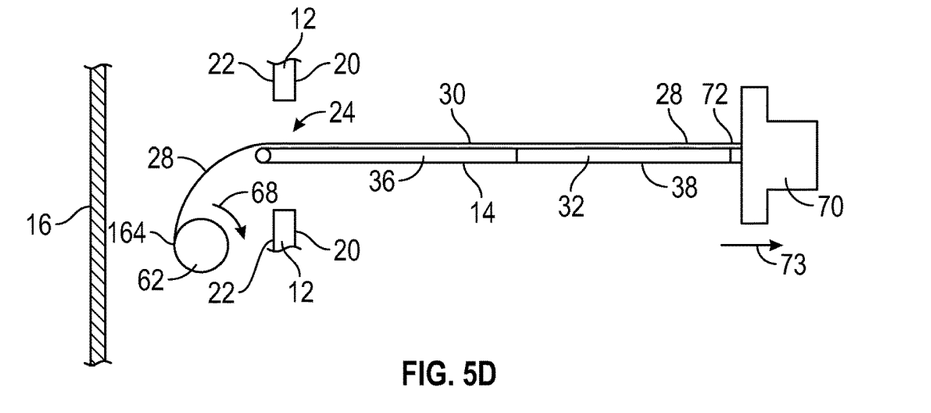
FIG. 5D illustrates a cross-sectional view of the deployable support, sub-assembly depicted in FIG. 4 in the deployed position.

Referring also to FIGS. 5C-5D, an outer surface 22 is disposed along the backside of the interior trim panel 12 opposite the outer surface 20. In an exemplary embodiment, the outer surface 22 is substantially covered by the interior trim panel 12 so that the outer surface 22 is mostly or fully concealed (e.g., substantially not exposed) from any vehicle occupants-in the vehicle interior of the motor vehicle. As illustrated, an opening 24 is formed through the interior trim panel 12 extending from the outer surface 20 to the outer surface 22.

Figure 2:
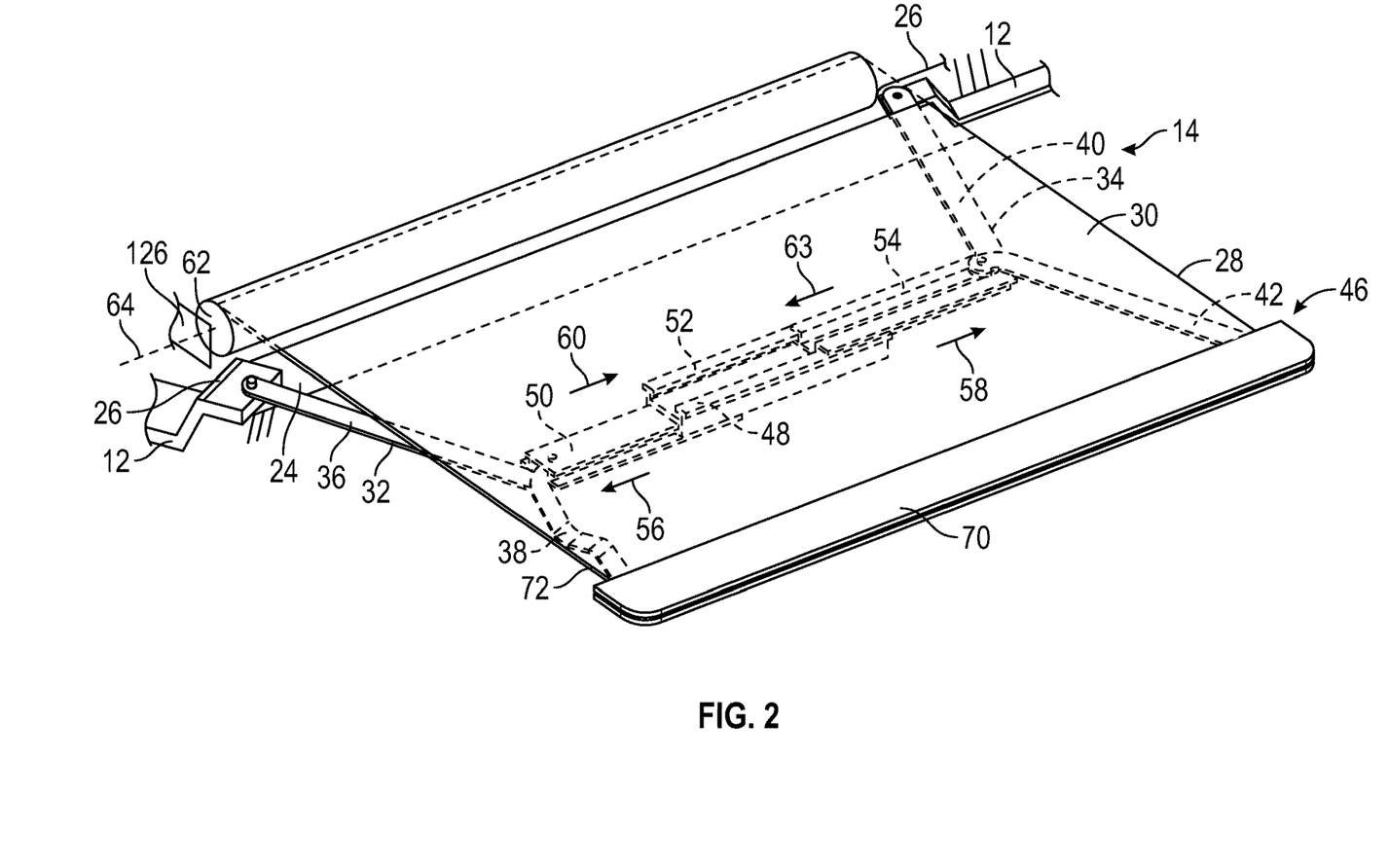
FIG. 2 illustrates a perspective view of a deployable support sub-assembly m a deployed-position in accordance with an exemplary embodiment.
Figure 3:
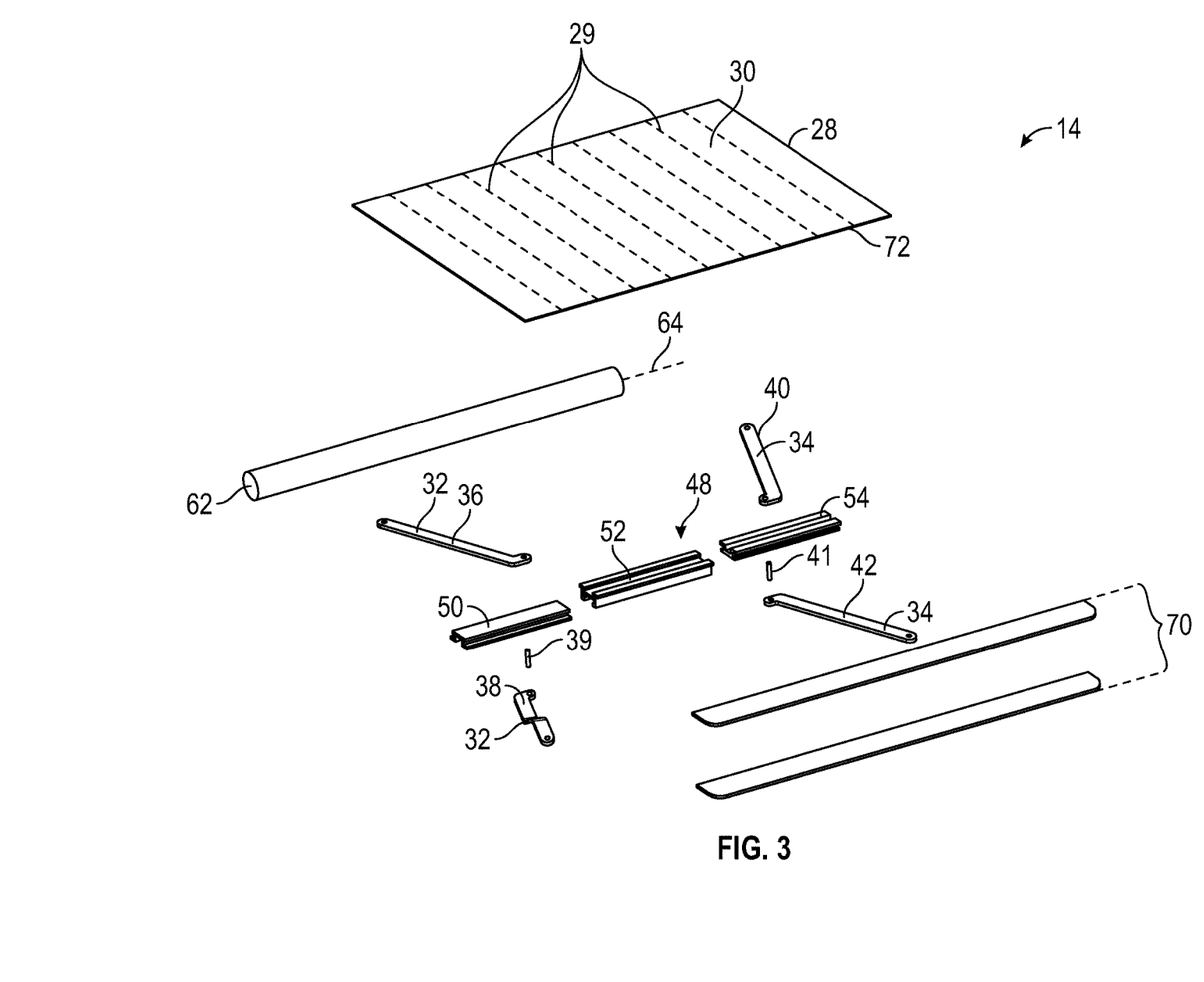
FIG. 3 illustrates an exploded view of a deployable support sub-assembly in accordance with an exemplary embodiment.
Figure 4:
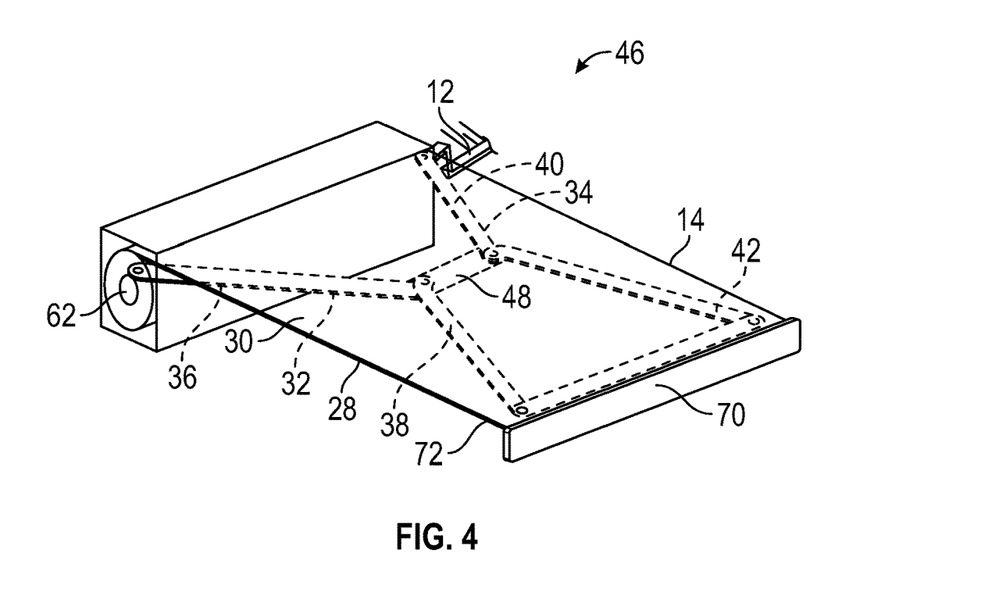
FIG. 4 illustrates a perspective view of a deployable support sub-assembly in a deployed position in accordance with an exemplary embodiment.

Referring to FIGS. 1-3 and as discussed above, the deployable support sub-assembly 14 is coupled to the interior trim panel 12. The deployable support sub-assembly 14 may be directly coupled to the interior trim panel, for example, via attachment features 26 (e.g., tabs, ribs, positive features, negative features, or the like). Alternatively, the deployable support sub-assembly 14 may be indirectly coupled to the interior trim panel, for example, via a bracket(s) or other attachment feature(s) that is coupled to the structure 16 of the motor vehicle.

Figure 8:
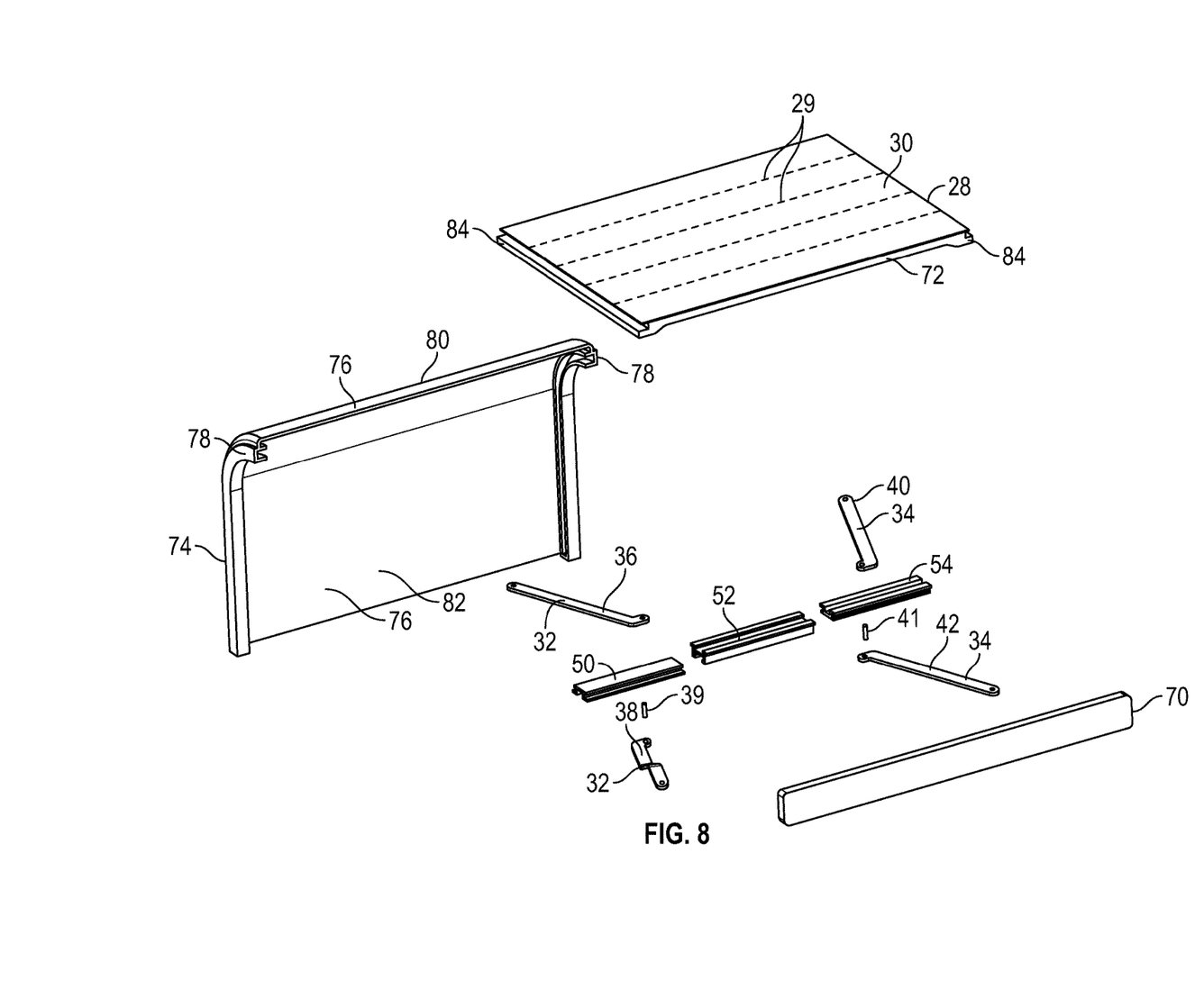
FIG. 8 illustrates an exploded view of a deployable support sub-assembly in accordance with an exemplary embodiment.

The deployable support sub-assembly 14 includes a support layer 28 having a support surface 30 for supporting an object. In an exemplary embodiment, the support layer 28 is formed of a relatively flexible material(s) that can be bent, rolled-up, or otherwise deformed for storage within a limited packaging space and can be tensioned or otherwise semi-rigidized to provide a relatively firm and flat support surface 30 for supporting an object. The support layer 28 may be formed of a single layer of material or alternatively, may be formed of a plurality of sublayers (e.g., coextruded sublayers) formed of the same material are different materials. In an exemplary embodiment, the support layer 28 includes one or more layers of a polymer saver, a plastic layer, a textile layer, and/or an elastomeric layer. The support layer 28 may be a continuous layer or may be formed of a plurality of juxtaposed pleated sections 29 that are coupled together. The juxtaposed pleated sections 29, for example, may extend between the forward and rearward ends of the support layer 28 as illustrated in FIG. 3 or alternatively, may extend between the lateral edges of the support layer 28 as illustrated in FIG. 8.

Referring to FIGS. 1-5D, in an exemplary embodiment, a pair of movable arms 32 and 34 are disposed adjacent to the support layer 28 opposite the support surface and are coupled to the support layer 28. The movable arms 32 and 34 are configured to move the support layer 28 through the opening 24 and between a storage or stowed position 44 and a deployed position 46, for example, via manual force or actuation provided by a vehicle occupant. In an additional embodiment, the movable arms 32 and 34 are configured to collapse or fold during an impact event to move the support layer 28 from the deployed position 46 back through, the opening 24 to the stowed position 44. As illustrated, in the stowed position 44, the support layer 28 is disposed adjacent to the outer surface 22 behind the interior trim panel 12. As such, the support layer 28 is substantially covered or concealed by the interior trim panel 12 when viewed from the vehicle interior of the motor vehicle by a vehicle occupant. In the deployed position 46, the support layer 28 extends through the opening 24 into the vehicle interior adjacent to the outer surface 20 of the interior trim panel 12. As such, the support surface 30 of the support layer 28 extends, for example substantially horizontally, into the vehicle interior of the motor vehicle for use by the vehicle occupant for supporting an object or the like.

In an exemplary embodiment, the movable arm 32 includes arm sections 36 and 38 that are pivotably coupled together via a pin 39. Likewise, the movable arm 34 includes arm sections 40 and 42 that are pivotably coupled together via a pin 41. The arm sections 36 and 38 of the movable arm 32 and the arm sections 40 and 42 of the movable arm 34 cooperate to move the support layer 28 between the stowed position 44 and the deployed position 46. In particular, the movable arms 32 and 34 fold towards each other respectively about the pins 39 and 41 when the support layer 28 is moved from the deployed position 46 towards the stowed position 44 (as shown in FIG. 5B) and unfold away from each other respectively about the pins and 41 when the support layer 28 is moved from the stowed position 44 towards the deployed position 46 (as shown in FIG. 5A).

As illustrated, the deployable support sub-assembly 14 includes a movable cross-support structure 48 that is coupled to the movable arms 32 and 34 proximate the pins 39 and 41. In an exemplary embodiment, the movable cross-support structure 48 and the movable arms 32 and 34 cooperate as an understructure when in the deployed position 46 to help support the support layer 28 for supporting an object. Further, the movable cross-support structure 48 moves in relationship with the movement or folding and unfolding of the movable arms 32 and 34. In an exemplary embodiment, the movable cross-support structure 48 expands when the movable arms 32 and 34 unfold during movement from the stowed position 44 towards the deployed position 46 and collapse when the movable arms 32 and 34 fold during movement from the deployed position 46 towards the stowed position 44.

In an exemplary embodiment, the movable cross-support structure 48 includes cross-support structure sections 50, 52, and 54 that are slidingly coupled together to allow telescopic movement of the movable cross-support structure 48 when the support layer 28 is moved between the stowed position 44 and the deployed position 46. As illustrated, when the support layer 28 is moved towards the deployed position 46, the movable arms 32 and 34 unfold in directions away from each other and the cross-support structure sections 50 and 54 move with the movable arms 32 and 34 and along the cross-support structure section 52 in outward directions (indicated by single headed arrows 56 and 58 respectively) to expand the movable cross-support structure 48. Likewise, when the support layer 28 is moved towards the stowed position 44, the movable arms 32 and 34 fold in directions towards each other and the cross-support structure sections 50 and 54 move with the movable arms 32 and 34 and along the cross-support structure section 52 in inward directions (indicated by single headed arrows 60 and 63 respectively) to collapse the movable cross-support structure 48.

In an exemplary embodiment, the deployable support sub-assembly 14 includes a rolling member 62 that is disposed adjacent to the outer surface 22 behind the interior trim panel 12. The rolling member 62 is coupled to an end portion 64 of the support layer 28. The rolling member 62 is configured to rotate about an axis 64 in a direction (indicated by single headed arrow 66 for wrapping or rolling-up the support layer 28 about the rolling member 62 when the support layer 28 is moved from the deployed position 46 towards the stowed position 44. Likewise, the rolling member 62 is configured to rotate about the axis 64 in a direction (indicated by single headed arrow 68) that is opposite the direction 66 to unwrap the support layer 28 from the rolling member 62 when the support layer 28 is moved from the stowed position 44 towards the deployed position 46.

In an exemplary embodiment, a biasing element 126 (e.g., spring or the like) is coupled to the rolling member 62 to bias the rolling member 62 to rotate about the axis 64 in the direction 66 for wrapping or rolling-up the support layer 28 about the rolling member 62. For example, a vehicle occupant manually moves the support layer 28 from the stowed position 44 to the deployed position 46 and the rolling member 62 rotates about the axis 64 in the direction 68, thereby overcoming the resistance from the biasing element 126 for unwrapping the support layer 28 from the rolling member 62. The movable arms 32 and 34 may provide sufficient resistance for maintaining the support layer 28 in fee deployed position 46. Alternatively, the deployable support sub-assembly 14 may include a selective locking feature, biasing or spring feature, and/or the like for selectively locking or maintaining the support layer 28 in the deployed position 46. For storage, the vehicle occupant can manually push the support layer 28 from the deployed position 46 towards the stowed position 44 and the biasing element 126 helps to rotate the rolling member 62 about the axis 64 for wrapping or rolling up the support layer 28 about the rolling member 62.

In an exemplary embodiment, the deployable support sub-assembly 14 includes an outer trim feature 70 that is coupled to an end portion 72 of the support layer 28. The outer trim feature 70 is disposed adjacent to the outer surface 20 of the interior trim panel 12 when the support layer 28 is in the stowed position 44. The outer trim feature 70 moves with the support layer 28 in a direction (indicated by single headed arrow 72) towards the vehicle interior and away from the outer surface 20 of the interior trim panel 12 when the support layer 28 is moved towards the deployed position 46. In an exemplary embodiment, the outer trim feature 70 provides an interlace for a vehicle occupant to apply manual force for moving the support layer 28 between the stowed and deployed positions 44 and 46.

Figure 6:
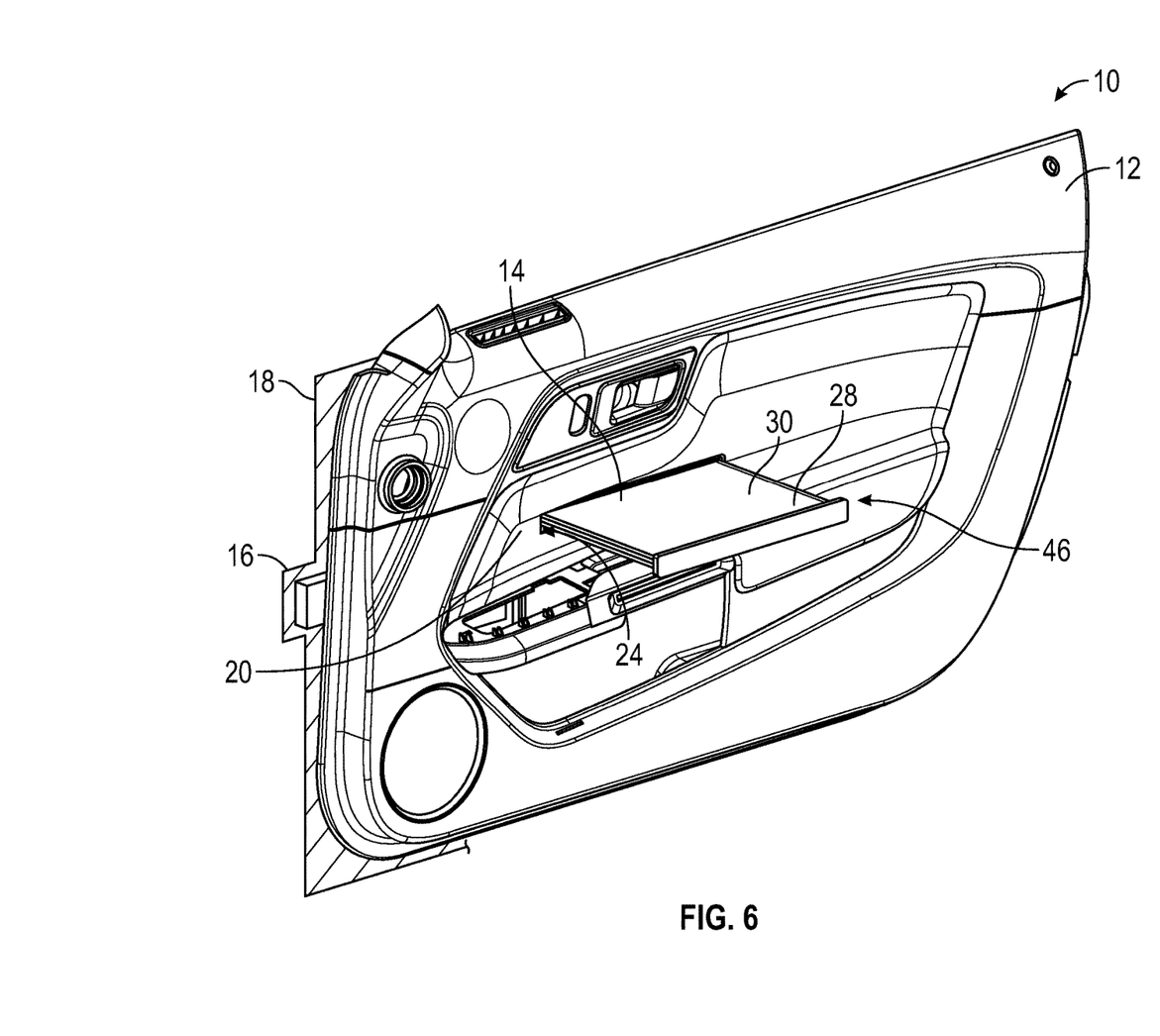
FIG. 6 illustrates a perspective view of an interior trim assembly including a deployable support sub-assembly in a deployed position in accordance with an exemplary embodiment.
Figure 7:
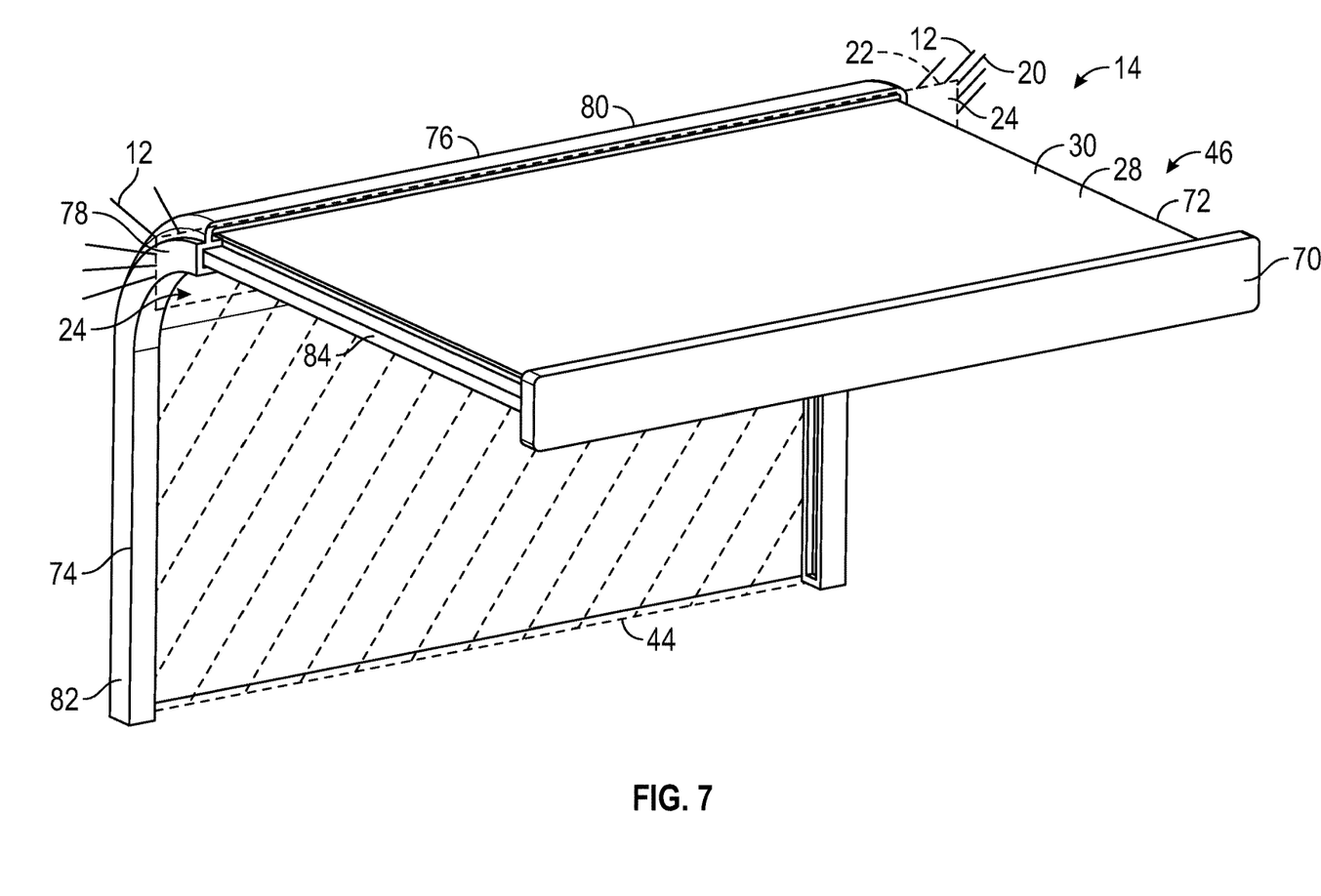
FIG. 7 illustrates a perspective view of a deployable support sub-assembly in a deployed position in accordance with an exemplary embodiment.

Referring to FIGS. 6-8, an alternative embodiment for the interior trim assembly 10 is provided. In particular, the interior trim assembly 10 including the interior trim panel 12 and the deployable support sub-assembly 14 as illustrated in FIGS. 6-8 are similarly configured to the interior trim assembly 10 including the interior trim panel 12 and the deployable support sub-assembly 14 as described above in relationship to FIGS. 1-5D but with the exception that a storage housing 74 is used for storing the support layer 28 in the stowed position 44 instead of the rolling member 62.

In an exemplary embodiment, the deployable support sub-assembly 14 includes the storage housing 74 that is disposed adjacent to the outer surface 22 on the backside of the interior trim panel 12. The storage housing 74 has a storage body portion 76 that is disposed between and end track portions 78. The upper portion 80 of the storage housing 74 is curved so as to transition from a substantially horizontal orientation to a substantially vertical orientation such that a lower portion 82 of the storage housing 74 extends in the substantially vertical direction. The edge portions 84 of the support layer 28 are configured to slidingly couple to the end track portions 78 of the storage housing 74 to allow the support layer 28 to move between the stowed position 44 and the deployed position 46. When the support layer 28 is moved from the deployed position 46 to the stowed position 44, the support layer 28 translates initially in a substantially horizontal direction and is received into the upper portion 80 of the storage housing 74 which redirects the support layer 28 towards the stowed position 44 in a substantially vertical direction. As illustrated, the support layer 28 is stored in a substantially vertical direction when the support layer 28 is in the stowed position 44. Likewise, when the support layer 28 is moved from the stowed position 44 to the deployed position 46, the support layer 28 translates initially in a substantially vertical, direction through the upper portion 80 of the storage housing 74 which redirects the support layer towards the deployed position 46 in a substantially horizontal direction.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide, those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior trim assembly for a vehicle interior of a motor vehicle comprising:
   an interior trim panel having a first outer surface for facing the vehicle interior and a second outer surface on a side opposite the first outer surface, the interior trim panel having an opening formed therethrough extending from the first outer surface to the second outer surface; and
   a deployable support sub-assembly coupled to the interior trim panel and including:
      a support layer; and
      a first moveable arm coupled to the support layer and including a first arm section and a second arm section pivotably coupled to the first arm section, wherein the first and second arm sections cooperate to move the support layer from a stowed position adjacent to the second outer surface, behind and substantially covered by the interior trim panel through the opening to a deployed position adjacent to the first outer surface of the interior trim panel for exposing to the vehicle interior.

2. The interior trim assembly of claim 1, wherein the support layer has a support surface that extends substantially horizontally when in the deployed position for supporting an object.

3. The interior trim assembly of claim 1, wherein the deployable support sub-assembly further includes a second movable arm coupled to the support layer, the second movable arm including a third arm section and a fourth arm section pivotably coupled to the third arm section, wherein the first and second movable arms cooperate to move the support layer between the stowed position and the deployed position.

4. The interior trim assembly of claim 3, wherein the support layer has a support surface for supporting an object when in the deployed position, and wherein the first and second movable arms are disposed adjacent to the support layer opposite the support surface.

5. The interior trim assembly of claim 3, wherein the first and second movable arms are configured to fold towards each other when the support layer is moved from the deployed position towards the stowed position and unfold away from each other when the support layer is moved from the stowed position towards the deployed position.

6. The interior trim assembly of claim 5, wherein the deployable support sub-assembly further includes a movable cross-support structure coupled to the first and second movable arms, and wherein the movable cross-support structure is configured to expand when the first and second movable arms unfold during movement from the stowed position towards the deployed position and to collapse when the first and second movable arms fold during movement from the deployed position towards the stowed position.

7. The interior trim assembly of claim 6, wherein the first and second movable arms and the movable cross-support structure are cooperatively configured to help support the support layer when in the deployed position.

8. The interior trim assembly of claim 6, wherein the movable cross-support structure includes a plurality of cross-support structure sections, and wherein the cross-support structure sections are slidingly coupled together to allow telescopic movement of the movable cross-support structure when the support layer is moved between the stowed position and the deployed position.

9. The interior trim assembly of claim 1, wherein the deployable support sub-assembly further includes a rolling member that is disposed adjacent to the second outer surface of the interior trim panel and that is coupled to a first end portion of the support layer, and wherein the rolling member is configured to rotate in a first direction for wrapping the support layer about the rolling member when the support layer is moved from the deployed position towards the stowed position and to rotate in a second direction that is opposite the first direction to unwrap the support layer from the rolling member when the support layer is moved from the stowed position towards the deployed position.

10. The interior trim assembly of claim 1, wherein the deployable support sub-assembly further includes a storage housing that is disposed adjacent to the second outer surface of the interior trim panel and that is slidingly coupled to an edge portion of the support layer, and wherein the storage housing is configured to receive the support layer when the support layer is moved from the deployed position towards the stowed position and to release the support layer when the support layer is moved from the stowed position towards the deployed position.

11. The interior trim assembly of claim 10, wherein the storage housing is configured for stowing at least a portion of the support layer in a substantially vertical direction when the support layer is in the stowed position.

12. The interior trim assembly of claim 1, wherein the deployable support sub-assembly further comprises an outer trim feature coupled to an end portion of the support layer, wherein the outer trim feature is disposed adjacent to the first outer surface of the interior trim panel when the support layer is in the stowed position and is moved with the support layer in a direction towards the vehicle interior away from the first outer surface of the interior trim panel when the support layer is moved towards the deployed position.

13. The interior trim assembly of claim 1, wherein the interior trim panel is a door panel.

14. The interior trim assembly of claim 1, wherein the support layer includes at least one of a polymer layer, a plastic layer, a textile layer, and an elastomeric layer.

15. The interior trim assembly of claim 1, wherein the support layer includes a plurality of juxtaposed pleated sections coupled together.

\* \* \* \* \*